April 5, 1966

C. F. ROBBINS ETAL 3,244,935

ELECTRICAL INDICATING DEVICE

Filed Feb. 19, 1957

Inventors
Clyde F. Robbins
John W. Vogel
By H R Rather
Attorney

April 5, 1966  C. F. ROBBINS ETAL  3,244,935
ELECTRICAL INDICATING DEVICE
Filed Feb. 19, 1957  5 Sheets-Sheet 2

Inventors
Clyde F. Robbins
John W. Vogel
By H R Rather
Attorney

April 5, 1966  C. F. ROBBINS ETAL  3,244,935
ELECTRICAL INDICATING DEVICE
Filed Feb. 19, 1957  5 Sheets-Sheet 4

Inventors
Clyde F. Robbins
John W. Vogel
By H R Rather
Attorney

April 5, 1966   C. F. ROBBINS ETAL   3,244,935
ELECTRICAL INDICATING DEVICE

Inventors
Clyde F. Robbins
John W. Vogel
By H. R. Rather
Attorney

United States Patent Office 3,244,935
Patented Apr. 5, 1966

3,244,935
ELECTRICAL INDICATING DEVICE
Clyde F. Robbins, Milwaukee, and John W. Vogel, Fox Point, Wis., assignors to Cutler-Hammer, Inc., Milwaukee, Wis., a corporation of Delaware
Filed Feb. 19, 1957, Ser. No. 641,177
10 Claims. (Cl. 315—129)

This invention relates generally to improvements in electrical indicating devices.

More specifically the invention relates to improvements in pilot light devices incorporating means for testing the lamp condition.

Pilot light devices may be employed to give visual indication of the existence or non-existence of some condition. Lamp illumination in some types of pilot light devices is controlled by signal contacts responsive to the condition being monitored. In such devices, if the lamp is not illuminated it is desirable to be able to determine whether this fact is evidence of the existence or non-existence of the condition being monitored or is the result of a defective lamp.

Consequently, it is an object of the invention to provide improved electrical indicating devices incorporating means enabling the lamp condition to be tested.

Another object is to provide such devices wherein the testing means are operable by depressing portions of the device associated with the lens.

Still another object is to provide such devices which are of a compact, heavy duty, liquid tight type and suitable for panel mounting.

A further object is to provide such pilot light devices which are interchangeable (with respect to mountings) with any one of a number of forms of devices in a control station.

A still further object is to provide such pilot light devices employing a plurality of elements which are interchangeable with respect to other devices in a control station, whereby mass production of the common element is made possible.

An additional object is to provide alternative forms of such devices which may be employed with various values of either alternating or direct current.

Other objects and advantages of the invention will hereinafter appear.

The accompanying drawings illustrate certain embodiments of the invention which will now be described, it being understood that the embodiments illustrated are susceptible of modifications with respect to certain structural details thereof without departing from the scope of the appended claims.

Referring first to the transformer type of pilot light device and its constituent elements shown in FIGS. 1 through 12, the numeral 31 designates the one-piece, hollow terminal base as electrically insulating member preferably formed by molding from any suitable insulating material such as "Bakelite." Referring to FIGS. 3, 5, 6 and 7, the end wall of said base is provided, on either side of a vertical boss integrally formed thereon, with recesses which accommodate the brass terminal plates 32 and 33, which are secured therein by riveting. Two insulated wire conductors 34 and 35 connected to the primary winding of a transformer 36 extend through notches formed in the lower edge of the end wall of said base and are welded, brazed or otherwise electrically connected to the terminal plates 32 and 33, respectively. The projecting portions of plates 32 and 33 are provided with tapped openings to accommodate the steel terminal screws which secure the U-shaped steel terminal lugs thereto. A wire conductor 37 which extends from a switch unit 38 is electrically connected to plate 32. In practice, a line conductor designated as L2 is electrically connected to terminal plate 33 (see FIG. 4).

Figures 3, 4:
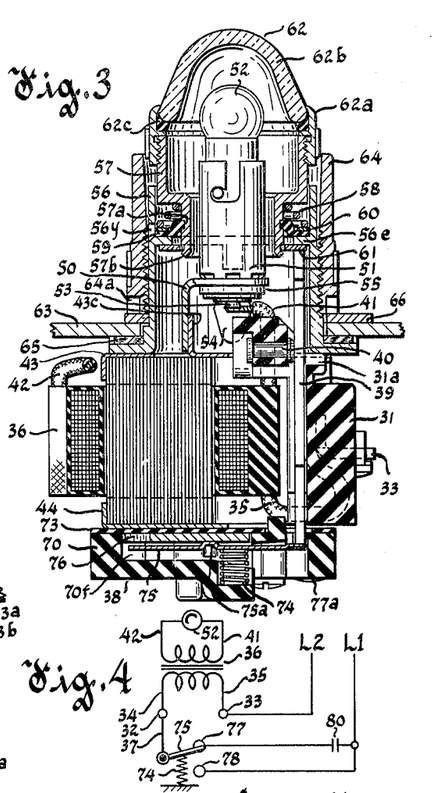
FIG. 3 is a sectional view of the device taken along line 3—3 of FIG. 1.
FIG. 4 is a circuit diagram of a transformer type device associated with signal contacts and connected to a source of power supply.
Figure 6:
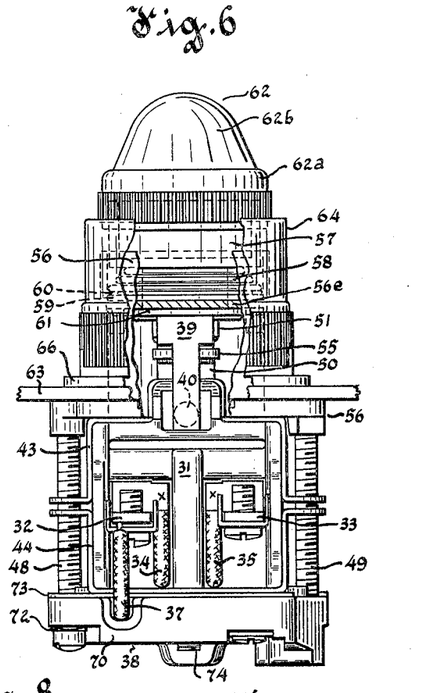
FIG. 6 is an elevational view of a third side of the device shown as panel mounted and with portions cut away to illustrate details.
Figures 7, 8:
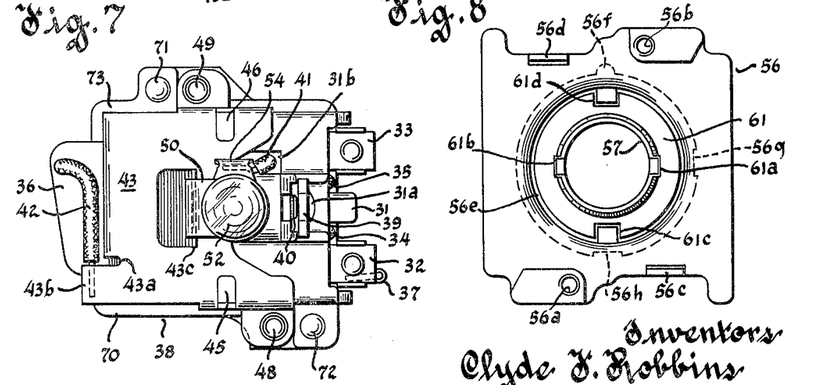
FIG. 7 is a top plan view of the device with portions removed to show details.
FIG. 8 is a bottom plan view of the portions removed from FIG. 7.
Figure 9:
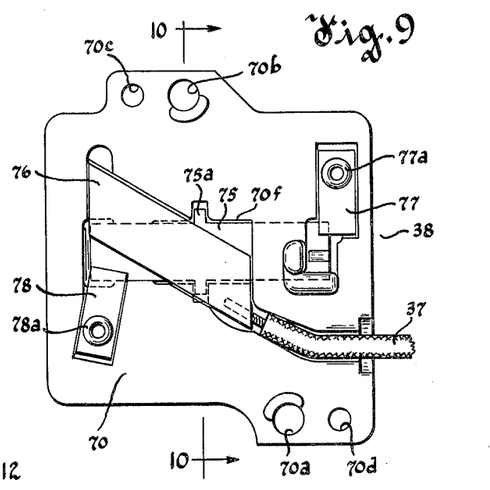
FIG. 9 is a top plan view of the switching mechanism forming part of the combined indicating lamp and push-button switch device of FIGS. 1–8 with cover removed to illustrate details.

The inner surface of the end wall of base 31 is provided with a channel which terminates in an opening 31a through the top wall of said base (FIGS. 3 and 7). A push bar or operating member 39, preferably formed from paper base phenolic insulating material, extends through opening 31a and through base 31 in the channel adapted to accommodate it. A rivet 40 secured to an integrally formed projection on the top wall of said base assists in positioning push bar 39 (FIGS. 3, 6 and 7). The inner edge of said top wall is slotted as at 31b to accommodate an insulated wire conductor 41, one end of which is electrically connected to the secondary winding of transformer 36 and the other end of which is welded, brazed or otherwise electrically connected to a receptacle lug 54 forming part of a lamp assembly.

Figure 5:
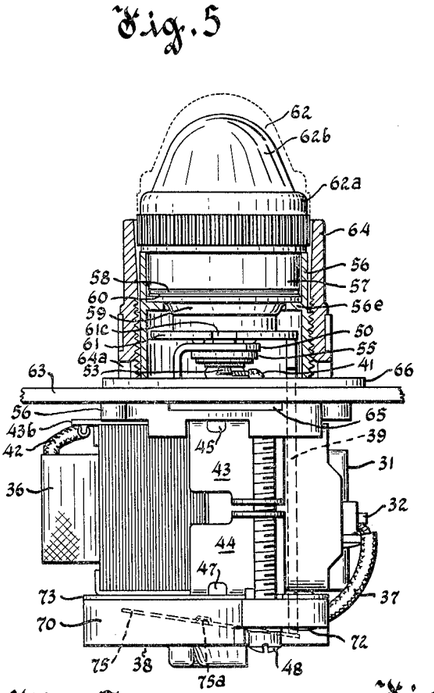
FIG. 5 is an elevational view of a second side of the panel mounted device partially sectioned along line 5—5 of FIG. 1 showing the lamp testing means depressed.

The substantially rectangular side walls which complete base 31 are provided with integrally formed portions which extend slightly beyond the end wall thereof to afford protection for the terminals carried thereby (FIGS. 5, 6 and 7).

When base 31 is properly associated with the transformer 36 the inner edges of the side walls of said base abut portions of the laminated iron core of said transformer as shown in FIG. 5, and a portion of the transformer coil is enclosed within said base (FIG. 3). It is to be understood that the transformer coil is comprised of appropriately insulated primary and secondary windings to which the wire conductors 34 and 35, and 41 and 42, respectively, are electrically connected (see FIG. 4). The transformer disclosed herein is adapted to have a 110 volt, 50 to 60 cycle, alternating current applied to its primary winding and to reduce said voltage to approximately 5 volts, said voltage being slightly less than the voltage of the lamp bulb 52 connected to the secondary winding of said transformer in order to prolong the life of the bulb. If preferred, transformers adapted to operate on voltages other than that specified and adapted to produce output voltages for lamps having ratings the same as, or different from, that specified may be employed, provided that their physical dimensions permit them to be utilized in the device.

Locking nibs integrally formed at the upper and lower inner corners of base 31 extend slightly beyond the upper and lower surfaces, respectively, of the core of said transformer and are adapted to cooperate with openings provided in upper and lower mounting brackets 43 and 44, respectively, which clampingly engage said base and said transformer as at 45 and 46 in FIG. 7 and as at 45 and 47 in FIG. 5. It is to be understood that base 31 is provided with another lower nib which is not visible in the drawings.

The upper mounting bracket 43, best seen in FIG. 7, is preferably formed by stamping from sheet metal and comprises a substantially rectangular main portion from which two extension arms depend. Two openings are provided in the main portion of bracket 43 to accommodate and engage the upper locking nibs of base 31 as hereinbefore described. One edge of said bracket is slotted as at 43a and the portion adjacent thereto is bent down to clampingly engage transformer 36. The tab 43b adjacent slot 43a is left unbent and the secondary conductor 42 is welded, brazed or otherwise electrically connected thereto (FIGS. 2, 3, 5 and 7). Upper bracket 43 is indented along one side thereof to afford clearance for the projecting portion of base 31 and for conductor 41. As will be clear from FIGS. 5 and 7, each downwardly extending arm of upper bracket 43 abuts a portion of the transformer core and a portion of base 31 thereby inhibiting relative lateral motion therebetween. The tips of the extension arms are bent outwardly at right angles to the arms themselves and are provided with openings which accommodate the assembly screws 48 and 49, respectively.

Upper bracket 43 is further provided with an integrally formed, upwardly sheared projection 43c to which an L-shaped lamp receptacle bracket 50, preferably stamped from sheet metal, is electrically and mechanically connected by spot-welding or other means (FIGS. 3, 5, 6 and 7). Receptacle bracket 50 is electrically and mechanically connected to the tubular portion 51 of the lamp assembly which is adapted to accommodate a miniature lamp bulb 52, preferably rated at 6 volts and having a bayonet type lamp socket. The brass ferrule of said lamp is in electrical contact with the tubular portion 51 while the central or other contact of said lamp (not visible) is in electrical contact with contact means 53 (a portion of which is visible in FIGS. 3 and 5) to which receptacle lug 54 is electrically and mechanically connected. As hereinbefore explained, lug 54 is connected to conductor 41. Contact means 53 and lug 54 are insulated from bracket 50 by a fiber insulating washer 55 and other insulating means (not visible) within tubular portion 55.

Lower mounting bracket 44 clampingly engages transformer 36 and base 31 in the same manner as upper bracket (FIGS. 2, 3, 5 and 6). Lower bracket 44 is formed from a sheet metal blank having the same shape as upper bracket 43 and is also provided with two openings for engaging the lower nibs of base 31 (FIG. 5). It is seen, however, that the side extension arms of the lower bracket 44 are bent upwardly instead of downwardly as is the case with upper bracket 43 and that the edge provided with the slot 44a is upwardly bent on either side of said slot. Furthermore, it is not necessary that lower bracket 44 be provided with an upwardly sheared projection. When both upper and lower brackets 43 and 44, respectively, are properly positioned, the transformer 36 and base 31 are held in fixed relation with respect to each other, thereby forming the sub-assembly shown in FIG. 7. It is seen that the openings provided in the outwardly bent tips of the extension arms of upper bracket 43 register with those similarly provided in lower bracket 44 and are in position to accommodate the shanks of the assembly screws 48 and 49, respectively, which extend through openings provided in integrally formed extensions at opposite sides of switch unit 38. The screws 48 and 49 take into tapped openings 56a and 56b, respectively, provided in the flat lower end portion of a retaining ring 56 (FIG. 8) thereby securing switch unit 38 and the sub-assembly shown in FIG. 7 thereto.

The retaining ring 56 which is in the form of a supporting sleeve having an external mounting flange and functions as a lamp base connected to the switch, preferably die-cast from a suitable metal alloy, has integrally formed projections on the bottom side of its flat lower end portion wherein the tapped openings are provided (FIG. 8). The inner side of said projections and the inner side of the smaller integral projections 56c and 56d serve to position retaining ring 56 on the sub-assembly shown in FIG. 7 and help to prevent relative motion between said sub-assembly and said retaining ring. FIGS. 3, 5, 6 and 8 show that retaining ring 56 is provided with an integrally formed, continuous flange or projection 56e on its interior surface and with two guides spaced 180 degrees apart, which extend from the lower surface of said projection and form an integral part thereof.

Lens holder 57 which is in the form of a housing or sleeve adapted to be slidably mounted within retaining ring 56 is machined from a suitable metal alloy and is provided with an externally threaded upper end portion which connects through a shoulder portion with the lower end portion which has a somewhat reduced diameter (FIG. 3). The lower end portion of said lens holder is provided with peripheral grooves 57a and 57b, near its center and near its end, respectively. As is clear from FIG. 3, lens holder 57 is adapted to enclose the lamp assembly. The smaller end of a spirally coiled compression spring 58 which serves to bias lens holder 57 outwardly from retaining ring 56 is seated against the shoulder of said lens holder (FIGS. 3 and 6). A circular flexible sealing member 59, preferably formed from synthetic rubber or similar material, is forcibly fitted over the lower end portion of said lens holder or slidable housing so that its relatively thicker inner edge seats tightly within the peripheral groove 57a formed in lens holder 57. The sealing diaphragm 59 is provided at its outer edge with a flat peripheral flange portion which is adapted to seat against the upper surface of the integrally formed annular flange or projection 56e on the interior wall of retaining ring 56. A flat, annular sheet metal member or washer 60 is preferably interposed between the flange of diaphragm 59 and the larger end of spring 58 to equalize the pressure applied to all portions of said flange, thereby insuring against entrance of oil, liquids or other foreign matter into the interior of the device notwithstanding the reciprocating movement of lens holder 57 as an incident to the operation of the lamp testing means.

A slotted washer 61, preferably formed by punching from sheet steel, is adapted to fit into the peripheral groove 57b of lens holder 57 and is secured thereon by flaring the end of said lens holder as is clear from FIGS. 3 and 8. Rotary motion of washer 61 with respect to lens holder 57 is prevented by projections integrally formed in lens holder 57 which engage the inner slots 61a and 61b, respectively, of washer 61. Rotary motion of lens holder 57 with respect to retaining ring 56 is prevented by the guides of retaining ring 56 which engage the outer slots 61c and 61d, respectively, of washer 61. Washer 61 also limits the upward or outward travel of lens holder or housing 57 by normally bearing against the lower side of integrally formed projection 56e of retaining ring 56 (FIGS. 3, 6 and 8).

The externally threaded upper end portion of lens holder 57 is adapted to receive a lens unit 62 comprising an internally threaded adapter ring 62a and a dome-shaped transparent or translucent glass lens 62b. A sealing gasket 62c which is preferably formed of rubber or similar material, is wedged between said glass lens and a flanged portion of said adapter ring to render the lens unit liquid-tight (FIG. 3). Adapter ring 62a is preferably knurled exteriorly to facilitate the attachment or removal of the lens unit 62 from lens holder 57 to afford access to bulb 52.

Figure 1:
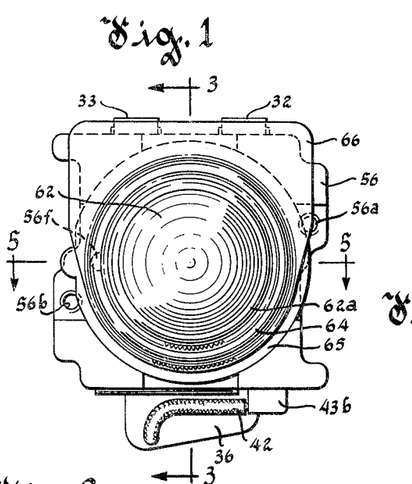
FIGURE 1 is a top plan view of a heavy duty liquid-tight transformer type indicating device or indicating light assembly adapted for panel mounting and incorporating lamp testing means.
Figure 2:
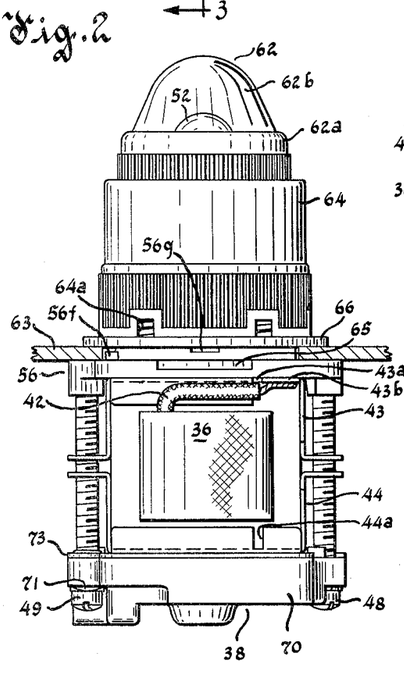
FIG. 2 is an elevational view of one side of the device shown as panel mounted.

FIGS. 1, 2, 3, 5 and 6 illustrate the manner in which the device may be attached or mounted to a panel 63, formed of metal or other suitable material. Panel 63 is provided with a substantially circular opening shaped to accommodate the cylindrical portion of retaining ring 56. The flat lower end portion of said retaining ring is provided, on its upper surface, with an integral outward projection 56f adapted to fit into a notch formed in panel 63 to positively restrain retaining ring 56 against rotary displacement with respect to said panel (FIGS. 1, 2 and 8). The cylindrical portion of retaining ring 56 has a screw thread cut on its exterior surface to accommodate the internally threaded mounting ring 64 which is knurled about its periphery to facilitate its attachment or removal (FIGS. 3 and 5). A flexible circular washer or gasket 65, preferably formed of cork or other suitable gasket material, is interposed between the rearward surface of panel 63 and the upper surface of the flat lower end portion of retaining ring 56 to insure against passage of oil, liquid or other foreign matter inwardly from the face of said panel. To facilitate the drainage of any fluid which may enter between retaining ring 56 and lens holder 57, two drain slots 56g and 56h (FIGS. 2, 3 and 8) are provided on the exterior of retaining ring 56 spaced ninety degrees apart. As will be clear from FIG. 3, each drain slot opens into the space between retaining ring 56 and lens holder 57. In mounting the device on a vertical panel it is preferred that one or the other of said drain slots face in a downward direction. Mounting ring 64 is preferably formed with an annular inner groove at its lower end, and is provided with a multiplicity of drainage openings or notches 64a (FIGS. 2, 3 and 4).

A perforated legend plate 66 which fits about the cylindrical portions of retaining ring 56 is interposed between the face of panel 63 and the bottom edge of mounting ring 64. Plate 66 is provided with a key or lug (FIG. 3) which engages either of the drainage slots formed in retaining ring 56 thereby enabling the plate to be associated with the device in either of two positions, that is to say, so that the large portion of plate 56 is positioned above or to one side of the device when said device is vertically mounted.

Figure 10:
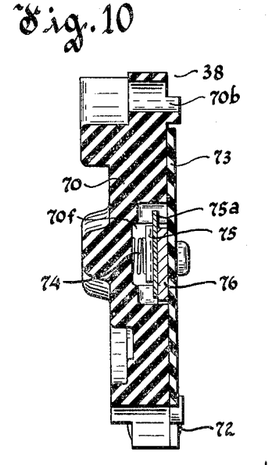
FIG. 10 is a sectional view of the switch unit with cover replaced taken along line 10—10 of FIG. 9.
Figure 11:
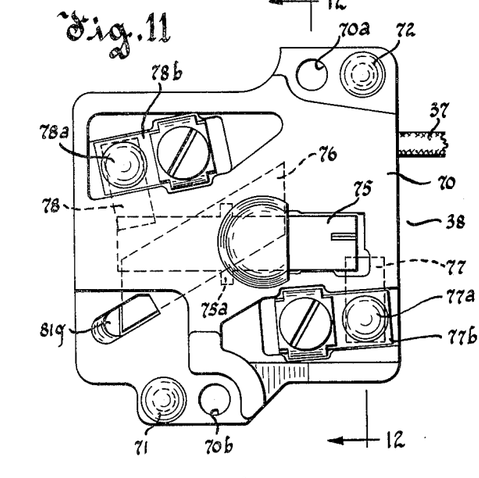
FIG. 11 is a bottom plan view of the switch unit.
Figure 12:
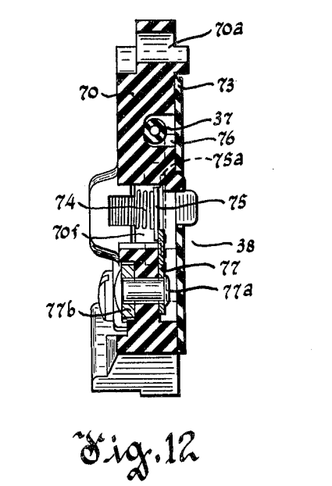
FIG. 12 is a sectional view of the switch unit taken along line 12—12 of FIG. 11.
Figure 13:
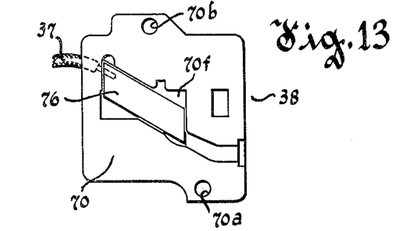
FIG. 13 is a top plan view of the switching mechanism showing the alternate form of connections employed when the switch unit is employed with the resistor type of device disclosed herein.

Switch unit 38 is shown associated with and a part of the transformer type device in FIGS. 2, 3, 5 and 6; is illustrated separately in FIGS. 9, 10, 11, 12 and 13; and is shown with a resistor type device in FIGS. 15, 16, 19 and 20. The numeral 70 designates the one-piece, molded, phenolic insulating base which is provided with diagonally disposed, integrally formed projections wherein are provided openings 70a and 70b, respectively, to accommodate assembly screws 48 and 49, respectively. Said projections are further provided with smaller openings 70c and 70d, respectively, adapted to accommodate the rivets 71 and 72, respectively, which secure an insulating cover 73, preferably formed of paper based phenolic material, to the upper side of switch base 70 (FIGS. 10, 11 and 12). Referring to FIGS. 3, 9, 10, 11 and 12, one end of a helical compression spring 74 is located in a recess within an integrally fromed projection extending from the lower surface of switch base 70. The other end of said spring extends into an elongated recess or chamber 70f within the main body portion of switch base 70 and bears against the bottom surface of a substantially rectangular contact bridge 75 contained therein. Contact bridge 75, preferably punched or stamped from sheet brass, is provided with an integrally formed contact portion 75a near its center which, as FIGS. 9, 10, 11 and 12 show, extends transversely to the length of said bridge and terminates in projections on either side of said contact bridge. Said projections, by engaging the sides of the recesses wherein they lie, limit the longitudinal travel of the contact bridge, that is to say, prevent the extreme ends of the contact bridge 75 from touching or scraping the ends of the longitudinal recess 70f wherein it lies. FIGS. 3, 9, 11 and 16 show that one end of contact bridge 75 is provided with an integrally formed ridge which insures that the downward pressure on said bridge by push bar 39 is always applied at the same point.

A contact plate 76, preferably formed of brass and having the shape of a parallelogram, lies in a recess which is disposed athwart and is partially coextensive with recess 70f in which contact bridge 75 is disposed (FIGS. 3, 9, 10, 11, 12 and 13). Contact plate 76 is welded, brazed or otherwise electrically connected to conductor 37 which, as is hereinbefore explained, is connected to terminal plate 32 on terminal base 31 of the transformer type device. Contact plate 76 is held in place in its recess by the action of insulating cover 73 attached to switch base 70.

Normally, biasing spring 74, bearing against the lower surface of contact bridge 75 slightly to one side of the contact portion 75a formed therein, forces said bridge upward so that its contact portion 75a bears against contact plate 76 and so that the end of contact bridge 75, which contains the ridge, is in elecrical contact with the lower surface of a contact 77 carried in a recess formed in the upper surface of switch base 70. Contact 77 is secured by a rivet 77a which extends through switch base 70 and acts to secure a terminal plate 77b, within a recess formed in the lower surface of said switch base. Terminal plate 77b is provided with a steel terminal screw and a steel terminal lug.

When lens holder 57 is pressed into retaining ring 56, the push bar 39, which extends into the recess 70f in switch base 70 through the opening in the insulating cover 73, forces one end of contact bridge 75 downwardly against spring 74 and electrical contact between bridge 75 and contact 77 is broken. The other end of contact bridge 75, however, moves upwardly into contact with another portion of contact plate 76 and into contact with the lower surface of a contact 78 carried in a recess formed in the upper surface of switch base 70. The contact 78 is secured by a rivet 78a which extends through switch base 70. Rivet 78a also acts to secure a terminal plate 78b within a recess formed in the lower surface of said switch base. Terminal plate 78b is provided with a steel terminal screw and a steel terminal lug and is adapted to be associated with a line conductor L1 (see FIG. 4).

If contact bridge 75 is depressed to such an extent that electrical contact between contact portion 75a and contact plate 76 is broken, electrical contact still exists between the members at another point as is hereinbefore explained.

When lens holder 57 is no longer depressed, it is biased outwardly into normal position by spring 58, and push rod 39 ceases to force contact bridge 75 downward. Contact bridge 75 is forced back into normal poistion by spring 74 thereby causing electrical contact between it and contact 78 to be broken and electrical contact between it and contact 77 to be reestablished.

The transformer type device disclosed herein may be associated with a signal contact 80 and a power supply source (not shown) in the following manner, as is clear from FIG. 4. Supply line L2 is connected to one side of a power supply source (not shown) and to terminal plate 33 of terminal base 31. Another supply line L1 is connected to the other side of said power supply source and to terminal 78 carried by switch base 70. A set of signal contacts 80, which may be considered as normally open but which close in response to some condition, have one side connected to supply line L1 and have the other side connected to terminal 77 carried by switch base 70. With lines L1 and L2 energized, with signal contacts 80 open, and with contact bridge 75 biased into normal position no current flows through said device. Upon closure of signal contacts 80, however, current flow is established through conductor 35, the primary winding of transformer 36, conductor 34, terminal contact 32, conductor 37, contact plate 76, contact bridge 75, contact 77 and terminal 77b, thereby inducing current flow in the secondary winding of the transformer which is serially connected to conductor 42, upper bracket 43, lamp bracket 50, tubular receptacle 51, lamp bulb 52, contact means 53, receptacle lug 54, and conductor 41. Thus, if bulb 52 is in working order it will be illuminated upon closure of the signal contact.

If bulb 52 is not illuminated it is possible to determine whether signal contacts 80 are open or whether the lamp is defective by by-passing the signal contacts 80 and connecting the device directly across lines L2 and L1. This is done by depressing lens holder 57 so as to cause push rod 39 to move contact bridge 75 out of contact with contact 77 connected to signal contacts 80 and into contact with contact 78 connected to terminal 78b to which L1 is attached. Since the transformer 36 is thus being directly energized, should lamp 52 fail to light it is evident that said lamp is defective.

Referring now to the resistor type of pilot light device shown in FIGS. 14 through 21, it will be seen that the parts thereof which correspond with parts of the transformer type device of FIGS. 1 through 12 have been designated by like numerals of reference. As will be apparent, the resistor type device is employed for the same purpose, operates in substantially the same manner, and is panel mounted in the same way as is the transformer type device. However, the resistor type device can be operated on either alternating or direct current.

Figures 14, 15, 16, 17:
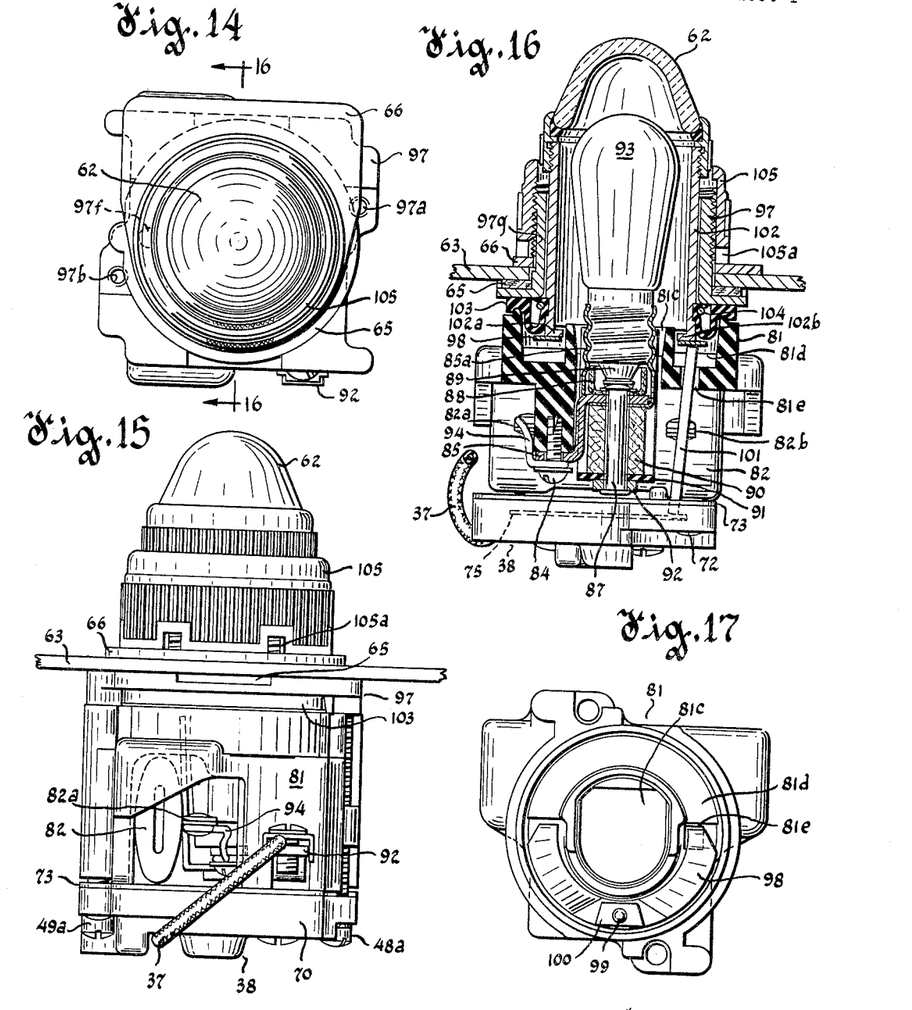
FIG. 14 is a top plan view of a heavy duty, liquid tight resistor type indicating device adapted for panel mounting and incorporating lamp testing means.
FIG. 15 is an elevational view of one side of the resistor type device shown as panel mounted.
FIG. 16 is a sectional view of the device taken along line 16—16 of FIG. 14.
FIG. 17 is a top plan view of the device with upper portions removed to show details.

Referring to FIG. 17, a base 81, preferably molded from any suitable insulating material such as "Bakelite," is provided with an upper portion having a substantially circular contour from which the lower portions depend. Portions of base 81 are shaped to form an enclosure for the resistor 82 employed in said device, as will be best understood from FIGS. 15, 18 and 20.

Figure 18:
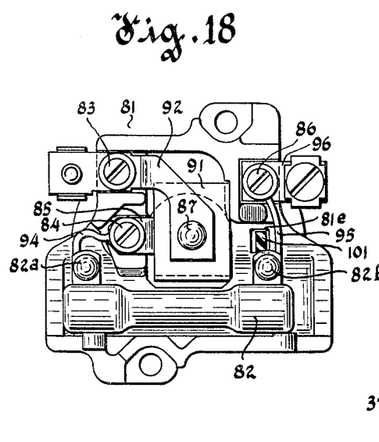
FIG. 18 is a bottom plan view of the device with switch unit removed to show details.

An opening 81c through the upper portion of base 81 accommodates a lamp assembly which is secured to said base by the screws 83 and 84 (FIGS. 16 and 18). FIG. 16 shows that the upper end of a brass contact plate 85 is inserted into the receptacle shell 85a through an opening or slot through the side thereof. When so inserted, an opening provided in said contact plate registers with an opening provided in the bottom of said receptacle shell, both of which openings are adapted to accommodate a relatively long steel rivet 87. A cup-shaped fiber insulating washer 88 and a bronze contact clip 89, both of which are adapted to fit on the shank of rivet 87 are interposed between the contact plate 85 and the head of said rivet. A hollow, tubular fiber insulator 90, a mica insulating strip 91, and a brass terminal bracket 92 (best seen in FIG. 18) fit onto the shank of rivet 87 below the shell 86 and all members of the lamp assembly are then secured in place by peening over the lower end of rivet 87. Preferably, a miniature lamp 93 having a rating of 6 watts at 120 volts is employed in the device, but obviously, other lamps may be employed if changes necessary to accommodate them are made.

The resistor 82 is provided with terminals 82a and 82b to which bare wire conductors 94 and 95, respectively, are mechanically and electrically attached by welding, brazing or other means. Conductors 94 and 95 are sufficiently strong to afford mechanical support for resistor 82 when the looped ends of said conductor are secured against the contact plate 85 and the terminal plate 96 by the screws 84 and 86, respectively, which take into tapped openings provided in the bottom of base 81 (FIGS. 16 and 18). As is clear, conductor 94 is electrically connected to contact plate 85 thus placing the resistor 82 in series with lamp bulb 93. The terminal plate 96 to which the other conductor 95 is electrically connected is adapted by a screw and a lug carried thereby to be connected to a line conductor L2 (see FIG. 21). The outwardly extending end of the brass terminal bracket 92 forming part of the lamp assembly is adapted by the screw and lug carried by it to be connected to a conductor 37 which is connected to the contact plate 76 within switch unit 38 (FIGS. 15, 16, 18 and 19). Preferably, resistor 82 has a rating of 1000 ohms (with a normal wattage of 18) and is adapted to be employed with a circuit of 120 volts, but obviously, resistors having other ratings may be employed.

Base 81 is also provided with integrally formed projections which are adapted to accommodate the shanks of the assembly screws 48 and 49 which secure the base 81 and the switch unit 38 to the retaining ring 97 by taking into tapped openings 97a and 97b provided in the flat lower end portion of said retaining ring.

When the retaining ring 97, preferably formed by die-casting from a suitable metal alloy, is secured in place it bears on the upper portion of base 81 in the manner illustrated in FIGS. 15, 16, 19 and 20.

Figure 20:
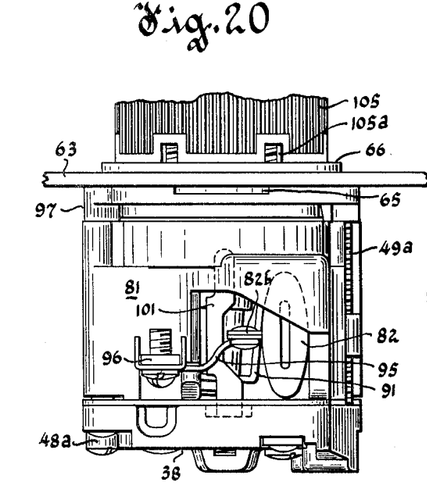
FIG. 20 is an elevational view of a portion of a third side of the device.

Referring to FIGS. 16 and 17, the upper portion of base 81 is provided with a substantially circular channel 81d. Approximately one-half of channel 81d is of slightly greater depth than the remainder thereof and is adapted to accommodate a C-shaped spring 98, which is preferably stamped from a sheet of copper alloy. Spring 98 is secured in said channel by a steel drive screw 99, and a steel washer plate 100 is interposed between said spring and the head of said screw. The lower side of one end of the upwardly curved spring 98 bears on a push rod 101 which extends into channel 81d through an opening 81e formed in the upper portion of base 81. Push rod 101 which extends into switch unit 38, best seen in FIG. 20, is formed of the same material as push bar 39 in the transformer type device. The upper sides of both ends of spring 98 bear on the spring depressors 102a and 102b integrally formed on the lower end of lens holder 102 normally biasing said lens holder outwardly of retaining ring 97.

Figure 21:
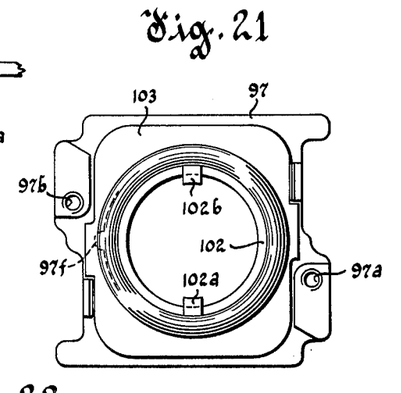
FIG. 21 is a bottom plan view of the portion of the device removed from FIG. 17.

The substantially cylindrical lens holder 102, preferably die-cast from a suitable metal alloy, is adapted to be slidably mounted within retaining ring 97 (FIGS. 16 and 21). Said lens holder is provided with a peripheral groove near its lower end. A flexible sealing member 103, preferably formed from synthetic rubber or similar material, is forcibly fitted over the lower end of lens holder 102 so that its inner edge seats within said groove. A circular metal spring 104 disposed about the periphery of said sealing member serves to hold said sealing member tightly in said groove. The sealing member 103 is provided at its outer edge with a relatively thick, flat flange of the contour best seen in FIGS. 16 and 21. The central portion of the sealing member 103, that is, the portion lying between the inner and outer edges is bent in the manner shown in FIG. 16. The outer flange portion of sealing member 103 is adapted to be interposed between the flat bottom surface of the lower end portion of retaining ring 97 and the top of base 81. When so interposed, the sealing member 103 insures against the passage of oil, liquid or other foreign matter into the interior of the device. In addition, sealing member 103 prevents rotary motion of lens holder 102 with respect to retaining ring 97. The upper end of lens holder 102 is externally threaded and is adapted to carry a lens unit 62 which is identical to that carried by the transformer type device.

Figure 19:
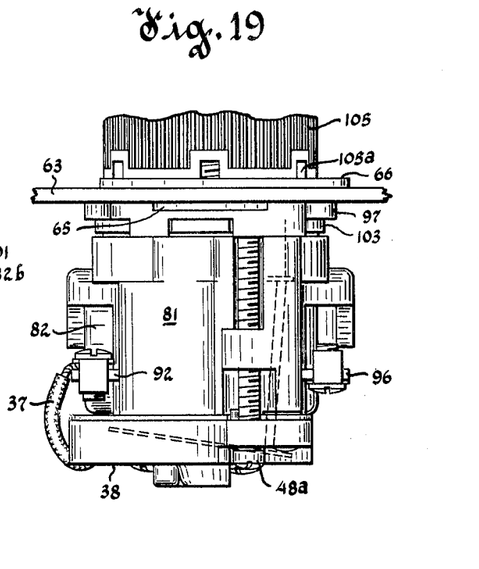
FIG. 19 is an elevational view of a portion of a second side of the device.

The switch unit 38 associated with the resistor type device is identical to that employed with the transformer type device and operates in exactly the same manner. It will be noted, however, from comparison of FIGS. 9 and 13, that when the switch unit 38 is employed with the resistor type device the conductor 37 is electrically secured to the opposite end of the contact plate 76 and is brought out through opening 81g in switch base 70 and is electrically connected to terminal bracket 92 (FIGS. 15 and 19). Such change has no effect on the internal connection or operation of switch unit 38 but is for convenience in assembly of the device.

The resistor type device is suitable for mounting in an opening in panel 63 in the same manner as the transformer type device. Thus, retaining ring 97 is externally threaded, has the same external diameter as retaining ring 56 of the transformer type device, is provided with an integral projection 97f identical to projection 56f already described, and has two drain slots 97g and 97h on its exterior surface in exactly the same position as those described in connection with the transformer type device. The washer interposed between the flat lower end portion of retaining ring 97 and panel 63 is identical to washer 65 already described. The retaining nut 105 securing retaining ring 97 to panel 63 has the same internal diameter and thread size as retaining nut 64 and is provided with a like number of similar drainage openings 105a as is nut 64. Retaining nut 105 is also exteriorly knurled. The legend plate 66 used in both devices is identical and is employed in the same manner with both devices.

Figure 22:
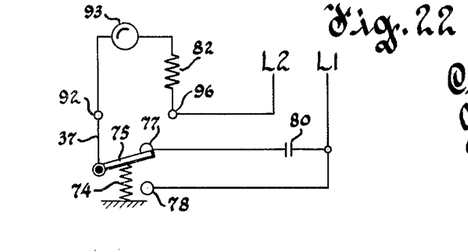
FIG. 22 is a circuit diagram of a resistor type pilot light device associated with signal contact and connected to a source of power supply.

The resistor type device is associated with a power supply source and with signal contacts 80 in the following manner as will be clear from reference to FIG. 22. Line conductor L2 is connected to terminal plate 96, line conductor L1 is connected to terminal 78b on switch unit 38, and the terminal 77b on switch unit 38 is connected to one side of the normally open signal contacts 80, the other side of which contacts is connected to line L1. With lines L1 and L2 energized, and upon closure of signal contact 80 current flow is established from L2, through terminal plate 96, conductor 95, resistor 82, conductor 94, contact plate 85, shell 85a, lamp 93, contact clip 89, rivet 87, terminal bracket 92, conductor 37, contact plate 76 of switch unit 38, contact bridge 75, contact 77, to line L1. Upon depression of lens carrier 102 push rod 101 moves contact bridge 75 in the manner hereinbefore described in connection with the transformer type device thereby causing contact between bridge 75 and contact 77 to be broken and contact between bridge 75 and contact 78 to be established. Thus, signal contacts 80 are bypassed and lamp 93 and resistor 82 are in series across lines L1 and L2 directly. Ceasing to depress lens carrier 102 allows switch unit 38 to reestablish its normal connection as has hereinbefore been described.

We claim:

1. A combined indicating lamp and push-button switch comprising a supporting sleeve having an external mounting flange formed integrally therewith, a housing slidably disposed in the sleeve, a lamp bulb in the housing, a lens disposed over the bulb and movable with the housing, a spring for biasing the housing outwardly in the sleeve, an operating member actuated by said housing when said lens is depressed, a unitary separately enclosed spring return switch disposed exteriorly of the sleeve and supported by the flange, a transformer supported by said flange, and said switch having contact members actuated by said operating member to control the energization of said lamp through said transformer.

2. In an indicating light assembly, the combination comprising; a switch having a pair of spaced stationary contacts and a movable contact normally in engagement with one of the stationary contacts and movable when actuated to engage the other stationary contact, a lamp base connected to the switch and having a central bore therein, a lamp socket mounted in the bore, a sleeve slidable in the bore between the socket and the walls of the bore, a member for actuating the switch whenever the sleeve is moved in the bore and for abutting against a portion of said base to maintain the sleeve against removal from the bore, and electrical connections between the socket and switch for energizing a lamp bulb in the socket whenever the switch is actuated.

3. A combined indicating lamp and push-button switch comprising a supporting sleeve having an external mounting flange formed integrally therewith, a housing slidably disposed in the sleeve, a lamp bulb in the housing, a lens disposed over the bulb and movable with the housing, a spring for biasing the housing outwardly in the sleeve, an operating member actuated by said housing when said lens is depressed, a unitary separately enclosed spring return switch supported by said sleeve, and said switch having contact members actuated by said operating member to control the energization of said lamp.

4. A combined indicating lamp and push-button switch comprising a supporting sleeve having an external mounting flange formed integrally therewith, a housing slidably disposed in the sleeve, a lamp bulb in the housing, a lens disposed over the bulb and movable with the housing, a spring for biasing the housing outwardly in the sleeve, an operating member actuated by said housing when said lens is depressed, a unitary separately enclosed spring return switch supported by said sleeve, and said switch having contact members actuated by said operating member to control the energization of said lamp and to perform additional switching operations.

5. A combined indicating lamp and pushbutton switch comprising a supporting sleeve having an external mounting flange formed integrally therewith, a housing slidably disposed in the sleeve, a lamp bulb in the housing a lens disposed over the bulb and movable with the housing, a spring for biasing the housing outwardly in the sleeve, an operating member actuated by said housing when said lens is depressed, a unitary separately enclosed spring return switch supported by the sleeve, said switch having contact members actuated by said operating member to control the energization of said lamp, means limiting movement of said housing outwardly in said sleeve, and sealing means rendering the space between said supporting sleeve and said slidable housing fluidtight comprising a resilient member having an opening therethrough, the edge of said opening being in sealing engagement with an outer portion of said slidable housing and another portion of said resilinet member spaced from said edge being in sealing engagement with said supporting sleeve, and an inner flange on said supporting sleeve against which said other portion of said resilient member is pressed by said spring to provide a fluid-tight seal therebetween.

6. A combined indicating lamp and pushbutton switch comprising a supporting sleeve having an external mounting flange formed integrally therewith, a housing slidably disposed in the sleeve, a lamp bulb in the housing, a lens disposed over the bulb and movable with the housing, a spring for biasing the housing outwardly in the sleeve, an operating member actuated by said housing when said lens is depressed, a unitary separately enclosed spring return switch supported by said sleeve, said switch having contact members actuated by said operating member to control the energization of said lamp, means limiting movement of said housing outwardly in said sleeve, and sealing means rendering the space between said supporting sleeve and said slidable housing fluid-tight comprising a resilient member having an opening therethrough, the edge of said opening being in sealing engagement with an outer portion of said slidable housing and another portion of said resilient member spaced from said edge being in sealing engagement with said supporting sleeve, and means for holding said other portion of said resilient member in sealing engagement with a portion of said supporting sleeve.

7. The combination according to claim 6 together with impedance means comprising a transformer having its secondary winding electrically connected to said lamp bulb and having one end of its primary winding adapted to be electrically connected to one side of a source of electrical power supply and the other end of its primary winding adapted to be electrically connected to a contract member carried by said switch.

8. The invention defined in claim 6, wherein said holding means comprises:
an electrically insulating member between said supporting sleeve and said unitary separately enclosed spring return switch;
a circuit for said lamp bulb comprising said contact members and impedance means;
and means mounting said lamp bulb and said impedance means on said electrically insulating member.

9. The invention defined in claim 8, wherein said electrically insulating member comprises:
means engaging said other portion of said resilient member to clamp the same against said external mounting flange of said supporting sleeve to provide a fluid-tight seal therebetween.

10. The combination according to claim 8 wherein said impedance means is a resistor having one of its ends adapted to be electrically connected to one side of a source of electrical power supply and having its other end electrically connected to one side of said lamp bulb, the other side of said lamp bulb being adapted to be electrically connected to a contact member carried by said switch.

References Cited by the Examiner

UNITED STATES PATENTS

| | | | |
|---|---|---|---|
| 706,314 | 8/1902 | Gilmore | 315—179 |
| 1,022,057 | 4/1912 | Bliss | 315—179 |
| 2,357,973 | 9/1944 | Robbins | 200—159 |
| 2,405,005 | 7/1946 | Anderson | 200—6 |
| 2,710,956 | 6/1955 | Hallerberg et al. | 340—214 X |
| 2,780,801 | 2/1957 | Tyler | 340—214 |
| 2,795,659 | 6/1957 | Miller et al. | 200—6 |
| 2,914,705 | 11/1959 | Krystian et al. | 317—99 |

FOREIGN PATENTS 540,525  8/1955  Belgium.

GEORGE N. WESTBY, Primary Examiner.

RALPH G. NILSON, Examiner.